(12) United States Patent
Thierauf (10) Patent No.: US 7,715,936 B2
(45) Date of Patent: May 11, 2010

(54) SYSTEM AND METHOD FOR THE PRODUCTION OF GOODS OR PRODUCTS

(75) Inventor: Rainer Thierauf, West Linn, OR (US)

(73) Assignee: I-Factory Inc., West Linn, OR (US)

( * ) Notice: Subject to any disclaimer, the term of this patent is extended or adjusted under 35 U.S.C. 154(b) by 427 days.

(21) Appl. No.: 11/844,101

(22) Filed: Aug. 23, 2007

(65) Prior Publication Data

US 2008/0077266 A1 Mar. 27, 2008

Related U.S. Application Data (60) Provisional application No. 60/840,112, filed on Aug. 25, 2006.

(51) Int. Cl.
*G06F 19/00* (2006.01)

(52) U.S. Cl. .............. 700/99; 700/14; 700/17; 700/29; 700/92; 700/97; 700/103; 700/108

(58) Field of Classification Search ............ 700/14, 700/16, 17, 28, 29, 49, 92, 95–97, 99–106, 700/108, 121, 173; 705/28, 29
See application file for complete search history.

(56) References Cited

U.S. PATENT DOCUMENTS

| | | | | |
|---|---|---|---|---|
| 5,040,123 A | * | 8/1991 | Barber et al. | 700/100 |
| 6,201,999 B1 | * | 3/2001 | Jevtic | 700/100 |
| 6,259,959 B1 | * | 7/2001 | Martin | 700/99 |

* cited by examiner

*Primary Examiner*—Sean P Schectman
(74) *Attorney, Agent, or Firm*—Wilmer Cutler Pickering Hale and Dorr LLP (57) ABSTRACT

A computer-based system and method for production planning are described that relies on developing factory shop floor modeling. This modeling includes simulating the factory shop floor to create a Virtual Factory. This Virtual Factory provides the ability to assess any possible production sequence for determining an optimal of production sequence according to the criteria defined the user.

20 Claims, 5 Drawing Sheets

SYSTEM AND METHOD FOR THE PRODUCTION OF GOODS OR PRODUCTS

CROSS REFERENCE TO RELATED APPLICATIONS

This application claims the priority under 35 U.S.C. §119(e) of U.S. Provisional Application No. 60/840,112, filed Aug. 25, 2006.

FIELD OF THE INVENTION

The present invention related to systems and methods that are used to determine efficient methods for the manufacture of goods or products. More specifically, the present invention is related to systems and methods that are used to determine optimally efficient methods for the manufacture of goods or products in an environment in which the same production line(s) is (are) used to produce different goods or products.

BACKGROUND OF THE INVENTION

In many manufacturing sectors, the market and efficiency demand that a single manufacturing facility produce a variety of goods or products, not just a single product variety. This manufacturing environment becomes more challenging when competitive pressure requires manufacturers to constantly improve/increase productivity in the manufacture of goods or products while at the same time decrease manufacturing costs and increase profits. In many cases, achieving the goals of (1) increased and effective manufacture of goods or products using a single manufacturing or production line and (2) meeting the competitive pressures are viewed as conflicting goals.

If a manufacturer is manufacturing goods or products that are to be produced in a number of varieties, it typically will require a large number of changeovers in production lines used to produce such goods or products. These changeover periods result in downtime for the machines used in the production line(s), which reduces productivity. In the face of the circumstances just described, manufacturers have tried various methods to attempt to optimize manufacturing and production processes by minimizing the number of changeovers required to manufacture or produce a variety of goods or products on a single production line.

In the manufacturing industry, the optimization process has been referred to as "production planning." Production planning may be very complex. Part of the reason for this is the constraints that exist for any manufacturing facility. Further, each manufacturing facility has its own set of unique constraints or restrictions.

Currently, factory staff solves the production planning problem either "manually" or with the help of "rules-based" software systems. The manual process involves a factory employee who considers the current demand, the current state of the factory, and previous experiences gained during the operation of the factory to guess an optimal production sequence. The "rules-based" software system codifies the experiences of factory staff into rules and uses these rules for production planning. Therefore, a "rules-based" system, which may be computer-based, solves the problem in a way similar to the factory staff's method of solving the problem manually. Using "rules-based" systems, however, may speed up the process.

Examples of production planning situations are set forth in the following two scenarios. These scenarios are meant to be examples only and do not encompass every possible scenario that could affect the production planning sequences for these production situations.

Scenario 1: If a manufacturer is producing a particular product on a production line and the variety of this product based on demand that must be produced are three red products and three green products, the following will apply for coloring step of the process for these products. The color will be applied by a coloring device. This coloring device must be cleaned for 30 minutes before a new color can be applied. The most optimal way to manufacture the products having these two colors is to manufacture all of the products of one color first—for example, the red products—then changeover for the coloring device for the minute changeover period, followed by coloring the remaining products with the second color—for example, green. As noted, this production sequence has one downtime of 30 minutes to clean the coloring device Scenario 2: Scenario 1 is a single changeover situation; however, in many cases the manufacturing process may be far more complicated for producing a variety of products. If the conditions for producing finished products, for example, require that partially finished products be transported to a different factory in special transportation crates for completion and there is a limited supply of these crates, and the shape of the product dictates the crate that is to be used for transportation, it is readily seen that the manufacturing process is more complicated. To illustrate the complications of the manufacturing process just described, if the product mix includes two products of the red variety and one product of the green variety and these have shape A, and all remaining products being manufactured have shape B, and all of the crates for shipping products with shape B are currently in use, then any products being produced that have shape B cannot be processed. The constraint associated with the availability of shipping crates can have a large impact on the manufacturing process.

Given these conditions, it is still necessary to determine a production schedule to optimize the use of the production line. The production schedule described for Scenario 1, which was to manufacture the reds first, changeover, and then manufacture the greens, will not work in this case because the third red product that has a shape B will require a transportation crate that is not available. Therefore, the production schedule must not only take into account the color but also the availability of the transportation crates (a factory restriction).

In the past, production planning has been principally solved by having knowledge of the factory restrictions through a set of production rules. These rules represented the know-how that factory workers developed over time in performing factory operations. For example, in Scenario 1, one such production rule could be stated as: "Produce the same colors in sequence." In Scenario 2, the production rules could be stated as: "Produce same colors as long as transportation crates are available." The problem that exists with relying on such a rule-based approached is that as soon as there is a change in any factory restrictions, there must be some corresponding change to the rules.

An example of how this may take place is the following. If the two Scenarios described above were altered with upgraded coloring equipment for the production line so that there was an additional "stand-by" coloring device, it would significantly change the production scheduling. This second coloring device could be used while the first device was being cleaned. More specifically, when a color change was necessary for the production of a variety of products, the second coloring machine can be brought on-line in the production sequence, while the first device is moved off-line to be cleaned. Thus, the changeover time for color changes would be reduced to zero from 30 minutes. The introduction of the second "stand-by" coloring machine would significantly change optimization of production scheduling.

Given this simple change in the production, any of the previous rules for optimizing productivity by minimizing color changeover times would become invalid and no longer needed; and the entire rule-based optimization scheme would have to be redesigned. As such, it is seen that rules-based systems and methods are fragile under changes in factory restrictions. Furthermore, rule-based optimization strategies also are only as good as the rules system, which is transitory, i.e., the knowledge of individuals, only sometimes experts, who derived the rules.

The present invention provides a system and method for optimization of production planning and overcomes these problems of the past based on manual or rule-based production planning.

SUMMARY OF THE PRESENT INVENTION

The present invention is a system and method for production planning that relies on the developing factory shop floor modeling. This modeling includes computer-based modeling of the factory shop floor. A computer-based system and method according to the present invention simulates the factory shop floor to create a Virtual Factory. This Virtual Factory provides the ability to assess any possible production sequence for determining optimization of production planning according to the criteria defined the user. The simulation of different possible sequences will provide the user with scoring to establish an optimal sequence based on user defined optimization criteria.

The system and method of the present invention makes it much easier than in the past to adapt to changes in factory restrictions. According to the present invention, changes in factory restrictions become factors in the developing a new Virtual Factory; and optimization is determined to provide production planning solutions.

The system and method of the present invention is dynamic and incorporates principles of theoretical physics by defining the dynamic system in terms of "state" and "time evolution operators." As such, by using the time evolution operator, it is possible to determine the state of the system at any time "$t_1$", if the initial state of the system at time "$t_o$" is known. Further, if all states of a dynamic system between an initial time $t_o$ and a final time $t_1$ are known, except for the system's dependency on a set of parameters, it is possible to determine a precise dynamic evolution of the system by optimizing (minimizing) the "action" functionally.

The present invention incorporates these principles by defining the factory shop floor as a dynamic system that is laid out according to "state" and "time evolution operators." In order to do this, the present invention defines the meaning of the "state" of a factory shop floor and the appearance of the "time evolution operators." By way of example, the state of the factory at any given time may be defined by the location as well as the current composition of predetermined equipment in the factory, which can include all of the equipment of the factory.

When the Virtual Factory is created, it will include the factory resources and restrictions, and initial state is determined. Using the present invention, this initial state is transformed into a final state consisting of completed products. The intermediate states at discrete time intervals are determined. This will permit the determination of score functions for the intermediate states. Rearranging the production sequences can be used to achieve optimization of scores and, therefore, optimization of production planning. The process of score optimization continues until the score is no longer improved. The final production sequence is the optimal sequence for the particular production plan.

The system and method of the present invention provides advantages over conventional methods of production planning problem. These include, but are not limited to, speed, robustness, unbiased solutions, flexible optimization, and analytic solutions.

The speed advantage that the present invention provides over conventional systems and methods of production planning is that in typical situations, the system and method of the present can reach a solution in minutes, while manual solutions may take hours. A rule-based software system may be faster than the manual solution method but does not reach the speed of the system and method of the present invention.

The robustness advantage that the present invention provides over conventional systems and methods is that it does not depend on rules derived from a particular setup of a given factory. In such a factory setup, many of the rules may become invalid if the factory setup changes. Production planning according to the present invention does not suffer from this drawback.

The present invention also provides an unbiased solution. For any possible production planning solution, there are a number of theoretically possible production sequences. Some may be extremely large and complex because it depends on the number of different products which are to be produced during a given production cycle. Conventional solutions do not consider substantially all of these possible solutions but are biased by experience-derived rules. Thus, for conventional systems, the quality of the optimal production sequence that is derived will depend on the quality of the rules and, ultimately, on the competence of the factory staff, who developed the rules. Production planning according to the present invention considers substantially all of the possible solutions and calculates the optimal solution analytically, unbiased by experience derived rules.

The present invention provides a system and method that enables flexible optimization. In conventional methods, optimization criteria are built into rules-based systems. Once a rules-based system is defined to optimize according to certain criterion, e.g., highest productivity, then the optimization criterion cannot be changed. The system and method of the present invention provides production planning in which the planning and optimization aspects are decoupled. The optimization criteria are input parameters for production planning and can be easily changed or combined.

Production planning of the present invention according to the present invention provides an analytic solution that allows for ease in changing the "Virtual Factory." The present invention can make these changes in the factory by simulating these changes first in the Virtual Factory and analyzing the impact of these changes to reach and optimized production sequence.

An object of the present invention is to provide a system and method for improving production planning.

Another object of the present invention is to provide a system and method for improving production planning that includes creating a Virtual Factory that is used to optimization of production planning.

A further object of the present invention is to provide a system and method for improving production planning that includes creating a Virtual Factory that is used for optimizing production planning that further uses a method of scoring to determine the optimized production plan.

These and other objects of the present invention will be described in greater detail in the remainder of the specification referring to the drawings.

DESCRIPTION OF THE INVENTION

The present invention is a system and method for improving production planning that overcomes the problems associated with rules-based systems. The present invention performs computer-based modeling of the factory shop. This modeling simulates the factory shop floor to create a Virtual Factory. The Virtual Factory that is created provides the ability to simulate and assess any possible production sequence for determining optimization of production planning according to criteria established by the user. The simulation of a number of different possible sequences will provide the user with scoring to establish the optimal sequence based on that user-defined optimization criteria.

The dynamic environment of the Virtual Factory is defined according to the "state" of the factory shop floor and the "time evolution operator" for the factory shop floor. The "state" of the factory shop floor at any given time is defined by the location as well as current composition of equipment on the factor shop floor. The "time evolution operator" is used to define the conditions at the initial state, final state, and any number of intermediate states.

If it is understood that state $t_0$ is the initial state and state $t_1$ is the final state, and the initial state $t_0$ of the factory shop floor is known, then the "time evolution operator" may be used to determine the final state $t_1$ and any desired intermediate states. The determination of these intermediate states will depend on the user-based parameters that are provided to the system. In using this information and preferably, Hamilton's principle of least action, it is possible for the user to determine the dynamic evolution of the system being modeled by the Virtual Factory by optimizing, i.e., minimizing, the action functionally.

In cases of mass production of products, it may not possible to track every single product being manufactured. In these situations, the system and method of the present invention employ an "Article Group," which is a collection of products of identical state to address the issue of not tracking each and every product in the manufacturing process. This will prevent system and method of the present invention being required track each product in production and dramatically improves system performance.

Resources that are identified in the Virtual Factory can operate on these Article Groups "in toto," and these actions will effect acting on the complete set of products being manufactured. There also is flexibility associated with the use of Article Groups. In this context, Article Groups may be split up and merged during the production process for purposes of achieving optimization in production planning. However, in order to "merge" Article Groups each Article Group must be in the identical state.

As stated, a time evolution operator is used to progress the production operation from an initial known state of the Virtual Factory shop floor to the final state. However, it is to be understood that time evolution of the factory is "discretized." Therefore, time in the sense of factory operation does not flow continuously but "jumps" in regular intervals. For example, time could be set to 15-minute intervals or 30-minute intervals within the scope of the present invention. However, a typical time interval is 15-minutes but it is a variable that is user determinative for a particular set of circumstances.

More specifically, the "time evolution operator" of a factory shop floor preferably is a collection of time evolution operators for the various equipment on the Virtual Factory shop floor. The time evolution operators also factor in the inter-resource restrictions.

As stated, Resources that have been referred to are the equipment that exists on the factory shop floor. Each piece of equipment has its own characteristic time evolution dynamics and properties. For example and not meant to limit the scope of the present invention, the following are Resources (equipment) that could be present on the factory shop floor:

Conveyor: This is Resource type that transports products being manufactured from one fixed location to another fixed location within the factory. The Conveyor works on a first-in-first-out basis and is defined by the distance it covers, the speed with which it moves, and the number of products it can transport per unit length.

Trucking Resource: This is a Resource type that transports products from place to place within the factory. It is characterized by its capacity, the velocity with which it moves, and the routes (distances), which it traverses. Trucking resources are first-in-last-out resources. Trucking resources can transport products between arbitrary locations in the factory. Trucking resources may require a human operator.

Stream Producer: This is a Resources type that produces articles by changing their state in a continuous or near continuous manner. An example of a Stream Producer resource is a printing press. The printing press can print a given number of pages per minute. The act of printing changes the article's state, such as a "blank page" to "printed page."

Batch Producer: This is a Resource type that produces a given number of products at the same time. The Batch Producer resource is characterized by its capacity, it is product dependent, and its load/unload speed. An example of a Batch Producer resource is an oven. An oven may be loaded with a number of loaves of unbaked bread. When the oven is loaded to capacity, the oven is switched on and bakes the loaves of bread for a given amount of time and at the end of this time, the baked loaves are unloaded. The state of the loaves has changed from "unbaked" to "baked."

Pulsed Producer: This is a Resources type that works on a "takt" or at some predetermined "frequency." A Pulsed Producer resource is characterized by the length or number of positions inside and the push frequency. At regular intervals, products enter the resource. Every time a product enters the resource, a finished product exits the resource according to first-in-first-out. The number of products within the resource at any given time depends on a size parameter (length, number of positions, etc.) of the resource. An example for a Pulsed Producer resource is an automated car wash. The car wash may have four positions inside: (1) "lathering," (2) "brushing," (3) "rinsing," and (4) "drying." A given car remains at each position for a fixed amount of time (the "takt"), then gets pushed forward to the next position. At "push-time," a new car may enter the car wash, and a finished car may exit. Some Pulsed Producer resources require that every position hold products, while others do not.

Buffer: This is a Resource type that relates to production lines that contain locations. These locations are where products can be "buffered" or stored for a period of time while they wait for downstream resources to become available. For example, in the bread-baking example, a Buffer resource may be required to store bread forms filled with unbaked dough in front of an oven while the oven is still baking the previous batch of bread. Buffer resources are characterized by their capacity. Buffer resources that are a Storage resource at the end of every production line may have unlimited capacity. Buffer resources are often shared among production lines. Buffer resources may have overflow or underflow exceptions.

Tools: This is a Resource type that is used as a "means of production." Tool resources do not produce anything themselves but are required for certain production steps. For example, in the oven example, the bread baking forms are considered Tool resources. Tool resources are characterized by the available amount of them. Tool resources are usually shared among production lines and even among resources. Tool resources are further characterized by the resource at which the Tool resource enters the production process, the resource at which the Tool resource is released, and cycle times. Again with regard to the bread-baking example, the bread dough could be placed into baking forms, which are Tool resources, just prior to baking. The baked bread might be "sprinkled" with sesame seeds after baking is complete. Afterwards, the bread may be taken from the baking forms; the forms may be cleaned and returned to a place in the production line where they may be used again.

Assembler: This is a Resource type that puts two or more objects, including Tools, together. Assembler resource types are characterized by the number of objects that they are capable of assembling in a given time interval. Again with regard to the baking example, the resource that places the bread dough into baking forms would be considered an Assembler resource, creating an assembled "unit" of the bread dough in the form.

Disassembler: This is a Resource type that separates parts from each other, or parts from Tool resources. Disassembler resources are characterized by the amount of objects that they are capable of disassembling into their constituent parts in a given time interval. Again referring to the bread-baking example, the Disassembler resource would the one that takes the baked bread out of the baking forms.

Pacemaker Resource: This is a Resource that determines the pace or "takt" of an entire production line. Typically, the Pacemaker Resource is the resource within a production line that has the lowest capacity i.e., a "bottleneck" in the process. If it is the goal of production planning to maximize productivity, then the production schedule must determine that the Pacemaker Resource of lowest capacity is in constant operation. The Pacemaker Resource can be considered as the "weakest link" in the production process. The Pacemaker resource cannot always be equally determined in a given production line. In many cases, the Pacemaker Resource depends on the current product mix. In rare situations, the Pacemaker Resource "jumps" from one place to another during the production process.

Resource Characteristics: Each of the Resources has a number of characteristics and some of the characteristics may be shared in common. These resources may have characteristics common, but the recitation of these characteristics does not mean that there may not be other characteristics associated with the resources. Accordingly, the resources may have the characteristics of:

(a) acting only upon products in a well defined state;
(b) acting upon products in a number of different states, changeover time may be required;
(c) producing any number of final states, changeover time may be required;
(d) requiring one or more human operators;
(d) have a maintenance schedule;
(e) failing without notice;
(f) having fixed hours of operation;
(g) having energy requirements;
(h) having a variety of unique characteristics.

Time Evolution: Time evolution of the shop floor of the Virtual Factory will depend on the Resources there with their internal restrictions, and the inter-resource or shop floor level restrictions. In this context, inter-resource restrictions may include, but not be limited to, the following:

Sharing Restriction: These are resources that may be shared among production lines or resources. For example, the baking forms from the bread-baking example may be used in different production lines feeding different ovens.

Exclusion Restriction: These resources may not be operated at the same time.

Same Product Restriction: These resources, when operated at the same time, may be required to operate on products at identical initial and final states. For example, there may be multiple machines filling baking forms with bread dough. It may not be possible to allow different forms to be filled with different bread dough, because the downstream oven program would have to be different.

Same Product Exclusion: These are resources that are the opposite of the "Same Product Restriction". Similar resources may not be able to operate on identical product states.

Multiple Supervision: These are resources that are typically in close proximity of each other. These resources may allow "joint supervision" by a single human operator.

Exception Restriction: Certain states must never occur in a production process. Most production lines are geared towards a Pacemaker resource. This resource must always have products on which it can operate. An exception would occur if this resource "runs out." Such an exception state is forbidden, so the production plan must be modified to avoid such a state.

Human Interaction Restriction: Certain human operators might not work well together and should be scheduled to work opposite shifts or on different resources, which are not in close proximity.

Energy Restrictions: Each resource may require energy for operation. Energy, especially electricity, varies in price. This restriction defines the pricing.

Scores: These are used for the purpose of evaluating different production sequences for determining when optimization is achieved for a certain set of circumstances. Given a factory shop floor's resources and restrictions, an initial state can be transformed into a final state consisting of completed products. The intermediate states at discrete time intervals between the initial and final states are calculated. In performing scoring, a certain numeric value is assigned for specific conditions during intermediate states. Optimizing production planning will mean optimizing the scores by rearranging production sequences. Scoring functions include, but are not limited to, the following:

Time Score: This score function is defined by the number of time intervals from production start until the last product in the production order leaves the factory. Minimizing this score leads to the fastest production.

Energy Score: This score function adds the energy costs during a production cycle. Minimizing this score leads to the most energy efficient production sequence.

Human Resources Score: This score function is the maximum number of human resources on the factory shop floor during any shift within the production cycle. Minimizing this score leads to even human resource utilization across shifts.

Optimization: Optimization parameters are determined and provided at "launch times" or "production starts" of each product of a production order. Optimization begins by selecting a random "working launch sequence" and calculating the score. In the next step, one parameter is "varied", i.e., the launch time of one product is changed. Since the launch times are interdependent, this has an affect on the launch times of the other products in the production order as well. Scores are calculated for each new launch sequence. If a score is better than the previous score, then the sequence with the better score becomes the new working sequence. If the score is not improved in a new sequence, the system reverts back to the original working sequence. This process continues until variations in launch sequences no longer improve the score. The final working sequence is the optimal solution for the selected score function.

Figure 1:
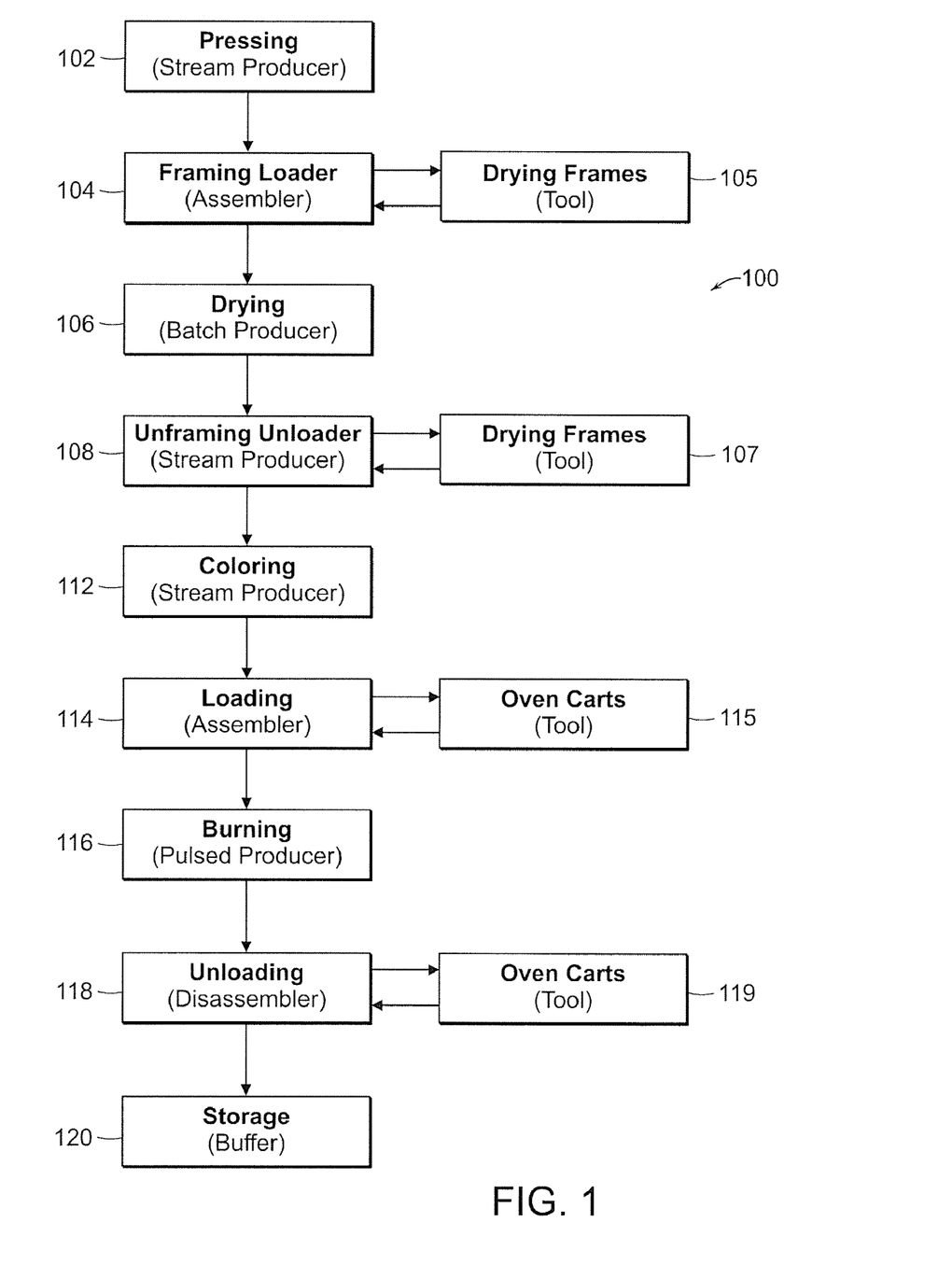
FIG. 1 shows a flow diagram for a sample production process for the production of ceramic tiles.

FIG. 1, generally at 100, shows a flow diagram for a sample production process for the manufacture of ceramic tiles. As an example of the operation of the present invention, the sample production process for the production of ceramic tiles will be optimized.

Again referring to FIG. 1, the shop floor from which the Virtual Factory will be developed is shown at 100. These tiles may be use for house shingles. At step 102, the clay is pressed into a specific shape. The press is a Stream Producer resource that is capable of producing many hundreds tiles per hour.

At step 104, the shaped tiles are placed into shape specific drying frames. In carrying out this step 104, the tiles are loaded into drying frames at step 105. The framing step at 104 is an Assembler resource and the Drying Frames at 105 are Tool resources.

The framed tiles are dried at step 106. Drying can last for many hours. The dryer at step 106 is a Batch Producer resource. After drying is complete, the tiles are removed from the drying frames. The unframing at step 108 is a Disassembler resource. In carrying out the unframing, the tiles are removed from the Drying Frames at 107. As stated, the Drying Frames are Tool resources.

The next step of production is coloring the tiles. At step 112, the dried tiles are sprayed with a chemical that will produce the true color of the shingle during the burning process. The machines that apply the color are Stream Producer resources capable of coloring many hundred tiles per hour.

After the tiles are colored at step 114, they are loaded for the burning process. In doing this, the colored tiles are loaded on oven carts at step 115. The loading is carried out by Assembler resource and the oven carts are Tool resources. Next, at step 116, the tiles on the oven carts are "pushed" through a tunnel oven and burned to bring out their color. The tunnel oven is a Pulsed Resource.

When the oven carts leave the oven, the shingles are remover from the oven carts by an unloader at step 118. The unloading of the oven carts is carried out at step 119. The unloader is a Disassembler and the oven carts are Tool resources. At unloading, the tiles will be sorted according to shape and color. The unloaded and sorted tiles are transported to a storage facility at step 120. The storage facility is a Buffer resource. At the storage facility, the finished tiles are packaged and shipped to customers.

In the non-complex single production line example just described, there were no restrictions for the Virtual Factory to consider. However, it is understood that there may be restrictions, the Virtual Factory may contain a number of production lines, and the production lines may share resources. These are factors that require consideration in Production Planning.

Figure 2:
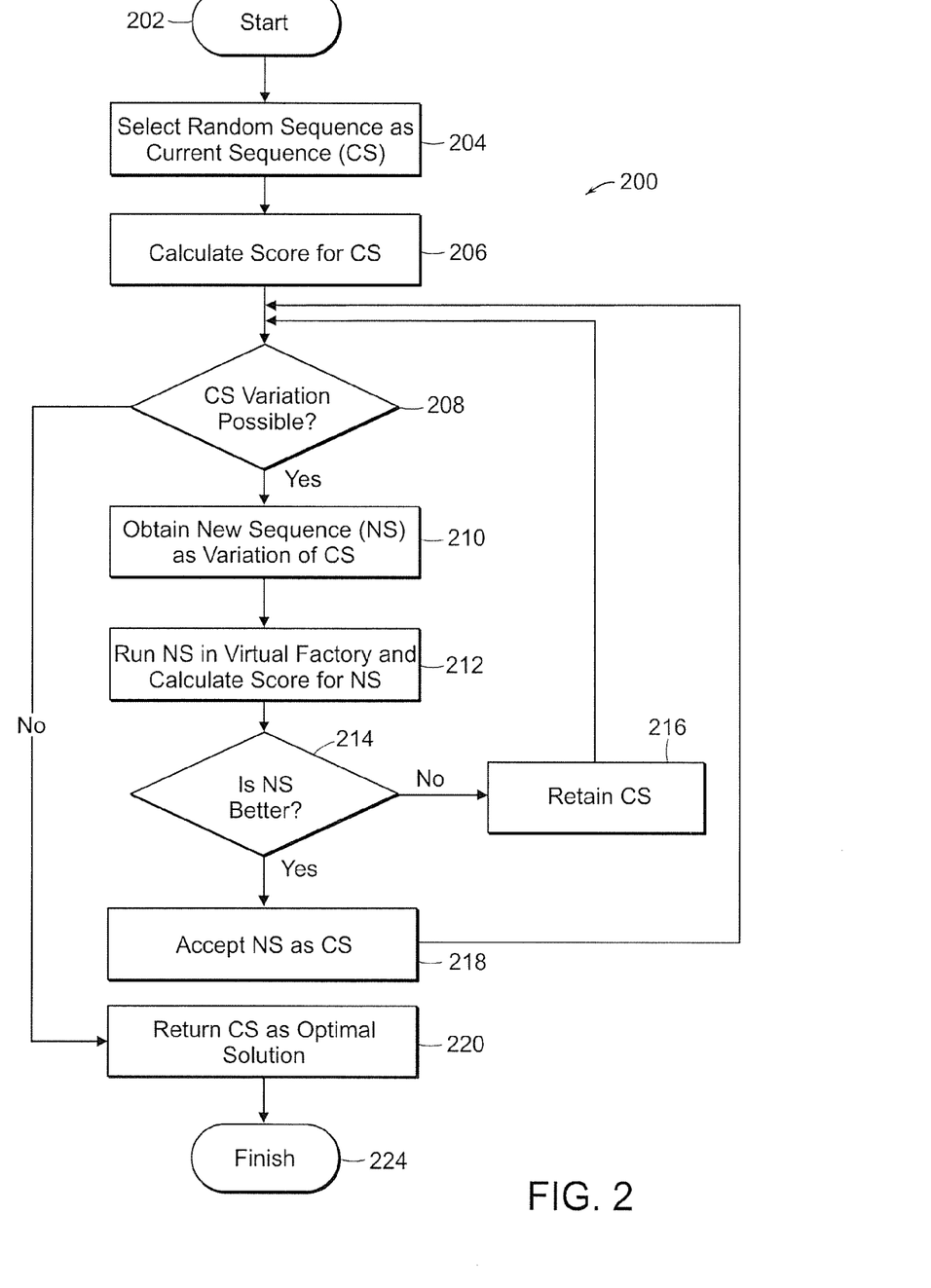
FIG. 2 shows a flow diagram that is used for determining an optimized production sequence using the scores determined according to the flow diagram in FIG. 3.

Referring to FIG. 2, generally at 200, a flow diagram is shown that is used for determining an optimized production sequence for manufacturing a particular product according to a Virtual Factory. In seeking the optimized production sequence, it is understood that preferably at least two sequences will be compared. However, preferably, there will be many more than two sequences will be compared comparison. In considering the flow diagram in FIG. 2, a "Sequence" refers to the order in which products are processed by the resources of the Virtual Factory and a "Variation" refers to at least two resources trading places in the "Sequence."

Again referring to FIG. 2, the optimization process starts at step 202 and proceeds to step 204. At 204, the method selects a Sequence at random and designates it as the "Current Sequence." It is also understood that the user could also create a large number of Sequences and store them for comparison.

Once the Current Sequence is selected at step 204, then the score for the Current Sequence is calculated at step 206. The method of calculating the score will be described in detail with regard to FIG. 3. After the score is calculated for the Current Sequence, a determination is made at step 208 whether there are Variations possible for Current Sequence. If there are any possible, then the determination at step 308 would be "yes" and the method would proceed to step 210. If the user has created and saved a number of sequences in advance, then the determination would also be "yes" and the method will proceed to step 210.

At step 210, the optimization process of FIG. 2 will make a change to the Current Sequence to create a "New Sequence." obtain a "New Sequence." If there were a number of sequences already stored, then one of these would be selected for comparison.

Figure 3:
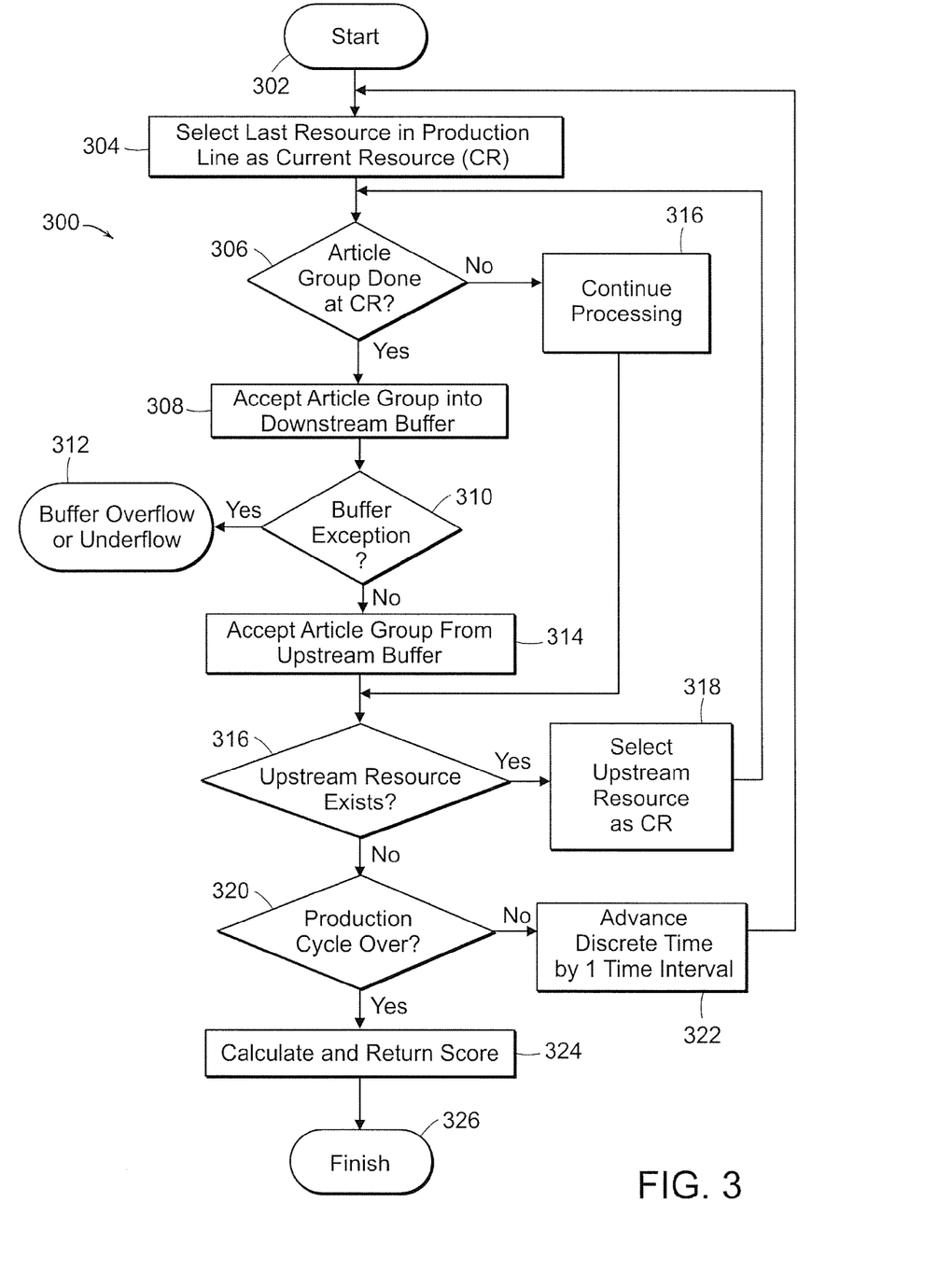
FIG. 3 shows a flow diagram that is used for determining a score for a production sequence, such as the sequence shown in FIG. 1, which are used in the optimization process of FIG. 2.

At step 212, this New Sequence will be run according the method of FIG. 3 to calculate the score for the New Sequence. There is a determination at step 214 as to whether the score of the Current Sequence or the New Sequence is better. If the score for the Current Sequence is better, the method will proceed to step 216 where the Current Sequence is retained as the better score and the method returns to step 208 to determine if there are other Variations possible. If there are none or the number of stored sequences is exhausted, the method will proceed to step 220 where the Current Sequence is returned as the optimal production sequence and method will move to end at finish step 222.

If at step 214, the New Sequence has the better score, the method will proceed to step 218 where the New Sequence is accepted as the Current Sequence and the method will return to step 208 to determine if there are other Variations possible. If there are none or all of the stored sequences have been scored and compared, then the method will proceed to step 220 where the Current Sequence, which was the New Sequence, is returned as the optimal production sequence and method will move to end at finish step 222. This process of score comparison is continued until all of the possible Variations or stored sequences have been compared leaving only one optimal production sequence.

Referring to FIG. 3, generally at 300, a flow diagram is shown that is used for determining a score for a production sequence, such as the sequence shown in FIG. 1. This score is then used in the optimization process of FIG. 2. Assuming the production process at FIG. 1, at step 302, the system user will start the calculation of the score for the production sequence. In understanding the operation of calculating the score according to FIG. 3, it is understood that each resource of the production line has an upstream buffer where Article Groups can be stored for some time. The capacity of the buffer is a configuration parameter. Further, at production line start, the upstream buffer or the first resource of the production line contains all of the Article Groups which are to be produced in a particular production cycle.

At step 304, there is a selection of the last resource in the production line as a "Current Resource." In the case of the process shown in FIG. 1, this would be the storage resource at step 120. When the storage resource is the last resource in the production line, it is understood to have infinite capacity to receive products, i.e., it can accept any number of products from Article Groups without restriction.

There is a determination at decision step 306 whether the products being processed at this step are an Article Group. As stated, an Article Group is used in mass production situations when it is not necessarily feasible to track every single product being manufactured. The Article Group will represent a collection of products of an identical state. In the case of the storage resource at 120 in FIG. 1, it would process the finished tiles as an Article Group and the process will proceed to step 308 of FIG. 3. If the tiles were not being processed as an Article Group, the process would proceed to step 316 and bypass steps 308, 310, 312, and 314 that are directed to Article Group processing.

Since the products are being processed at the Current Resource at 120 in FIG. 1 as an Article Group, the method of the present invention will proceed to step 308 in FIG. 3. At step 308, the Article Group of tiles is accepted into the downstream buffer. When the Article Group of tiles is accepted, next, there is a determination at step 310 as to whether there is a buffer exception for processing the Article Group. The two exceptions are shown at step 312. These exceptions are buffer overflow or underflow. These are configuration parameters that are set for the system operation.

In the tile production example, if the buffer overflow exception condition is experienced, the time spacing for tile processing is increased until this condition is prevented in a sequence rerun. If the buffer underflow exception condition is experienced, the time spacing is decreased until the condition is prevented in a sequence rerun. However, in the case of buffer underflow exceptions, it is possible that the time spacing between articles cannot decreased any further. In this case, this particular production sequence is disregarded and an entirely new production sequence is developed for the production of tiles.

If at step 310, there is not a buffer exception, the production process moves to step 314. At step 314, there will be an acceptance of the Article Group of tiles from the upstream buffer associated with the unloading machine at step 118 of FIG. 1 into the Current Resource under consideration, the storage resource at step 120 of FIG. 1. Once there is acceptance of the Article Group of tiles at step 314, there will be a determination at step 316 whether there are any upstream resources to the Current Resource under consideration. In the case where the Current Resource is storage resource 120, there is an upstream resource, the unloading resource at step 118 in FIG. 1. This will cause the process to move to step 318, which will select the unloading resource at 118 as the "Current Resource" and return to step 306 for evaluation of this resource for purposes of calculating the score.

The process just described will be repeated for each process step shown in FIG. 1 until the pressing resource step at 102 is reached. The difference at each step will be at steps 310/312 regarding any exceptions that exist for that particular resource. These exceptions will be configuration parameters that are input to the system.

Once the process of FIG. 3 is completed for the pressing resource at 102 of FIG. 1, the determination at 316 will move the method of calculating scores to step 320. At this step, there is a determination whether the production cycle is over. If it is not over, the process will move to step 322 which will result in the advancing, for example, the time for evaluating the process of FIG. 1 by one discrete predetermined time interval and evaluating the production sequence at the new time. This would be the situation if intermediate states between the initial and final states of the production sequence of tiles were being evaluated.

When the process of FIG. 3 reaches the final state, the determination at step 320 will proceed to step 324 where that the score is calculated and returned. At this step, the score calculation is in the form of a numeric value. The method of scoring preferably is according to a factory shop floor's resources and restrictions. This numeric value that represents the score is the sum of the scores for the resources in the production line and the relationship of these resources with each other in the configuration of the production line. This will apply to the initial, final, and intermediate states.

For example, the scores for resources could range from 100-1000, with the score of 100 being the best and 1000 the worst in a system where the lowest score for the overall product line would be the best score. As such, if the score for the Pressing Resource shown in FIG. 1 was 575 and the score for the second Pressing Resource that could be used was 423 because the second Pressing Resource had a Time Score advantage of 35 minutes per batch, then the second Pressing Resource would be preferable to use to lower the overall production line score.

As stated, in scoring, a certain numeric value will be calculated for specific arrangements of resources in the production line. Each resource is scored preferably according to its "Time Score," "Energy Score," and "Human Resources Score." Optimizing production planning will mean optimizing the overall production line score by rearranging products in the sequence and resources utilized from the production line to minimize the "Time Scores, "Energy Scores," and "Human Resources Scores." These scores will take into consideration the restrictions associated with each particular resource and the arrangement of resources. For example, if a Coloring Resource could optimally process tiles at a rate of 60 per minute but the Unframing Resource before it in the sequence could only process and feed the Coloring Resource at a rate of 45 per minute, then the "Time Score" for the Coloring Resource would have higher numeric value: 119 originally and 250 as used in that particular sequence. Although, scoring for a resource has been described in terms of "Time Scores," "Energy Scores," and "Human Resources Scores," it is understood that scoring may in terms of other factors and still be within the scope of the present invention. Also, it should be understood that there may be weighing factors applied to the "Time Scores", "Energy Scores", and "Human Resources Scores" in order to calculate the total score. In the example, the weighing factors are equal to "1" in each case.

As an example of scoring, the manufacturing process shown in FIG. 1 could be scored according to the Table below. In the Table, the individual scores for each resource of the sequence have been determined based on parameters of the resource, the restrictions that relate to the resource, and the interrelationship of resources in the sequence. The scoring for each category for each particular resource will be between 100 and 1000. However, if for example, there is no need for a particular category for a resource, such as there is not a Human Resource needed to operate that resource, then the score will be 0:

| Resource Name | Time Scores | Energy Scores | Human Resources Scores | Subtotals for Resources |
|---|---|---|---|---|
| 1. Pressing | 103 | 255 | 613 | 971 |
| 2. Framing Loader (Drying Frames) | 114 | 278 | 0 | 392 |
| 3. Drying | 83 | 356 | 0 | 439 |
| 4. Unframing Unloader (Drying Frames) | 85 | 155 | 0 | 240 |
| 5. Coloring | 119 | 212 | 512 | 843 |
| 6. Loading (Oven Carts) | 75 | 174 | 0 | 249 |
| 7. Burning | 128 | 452 | 0 | 580 |
| 8. Unloading (Oven Carts) | 78 | 155 | 0 | 233 |
| 9. Storage | 75 | 0 | 423 | 498 |
| | | | Total Score | 4445 |

Noting the table above, the score of 4445 would be returned and used for comparison with the scores of other production sequences so that the optimal production sequence may be determined. After the score for a particular sequence is calculated and returned, the method of FIG. 3 proceeds to step 326 that ends score calculation for this sequence.

The scoring that is set forth in the Table above is just for purposes providing an example and not for limiting the present invention in any way.

Figure 4:
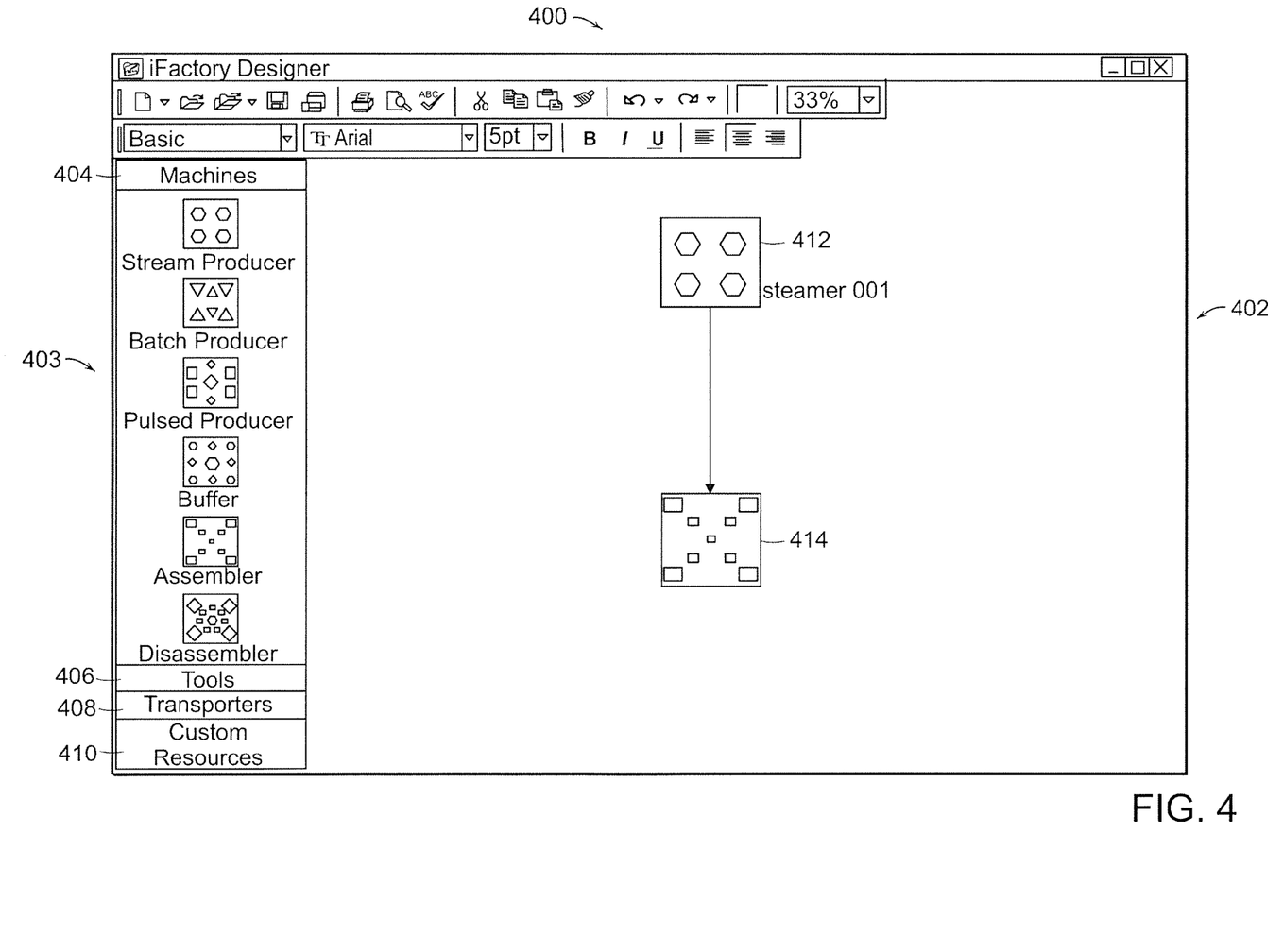
FIG. 4 shows an exemplary screen display for the implementation of the system and method of the present invention for developing Virtual Factory resources that may be used for determining an optimized production plan.

Referring to FIG. 4, generally at 400, a screen display is shown that is used by the system and method of the present invention for creating the Virtual Factory shop floor. This is used to create the Virtual Factory production line, such as that shown in FIG. 1, for evaluating such sequence to determine the optimal sequence.

Again referring to FIG. 4, the production line that is being created is assembled at 402. Section 403 of the screen display includes a tool chest of resources that may be used to create the production line. As shown, the tool chest for machine resources at 404 is currently open. This tool chest includes, but is not limited to, the icons for a Stream Producer, Batch Producer, Pulsed Producer, Buffer Assembler and Disassembler. At 406, the unopened tool chest for "tools" is shown, at 408 the unopened tool chest for "Transporters" is shown, and at 410, the tool chest for "Custom Resources" is shown. It is understood with respect to the present invention that more/less resources in the machines tool chest and more/less categories of resources may be provided and still be within the scope of the present invention.

Reviewing the screen display at 402, it shows the first two resources of the process of FIG. 1. These are Pressing resource at step 102 and the Framing Loader at step 104. These are both machines and can be obtained from the machines tool chest. More specifically, the Pressing resource is a Stream Producer resource and is shown at 412 of the screen display, and the Framing Loader resource is an Assembler resource and is shown at 414. The remainder of the resources may be added at 402 to complete the sequence.

Figure 5:
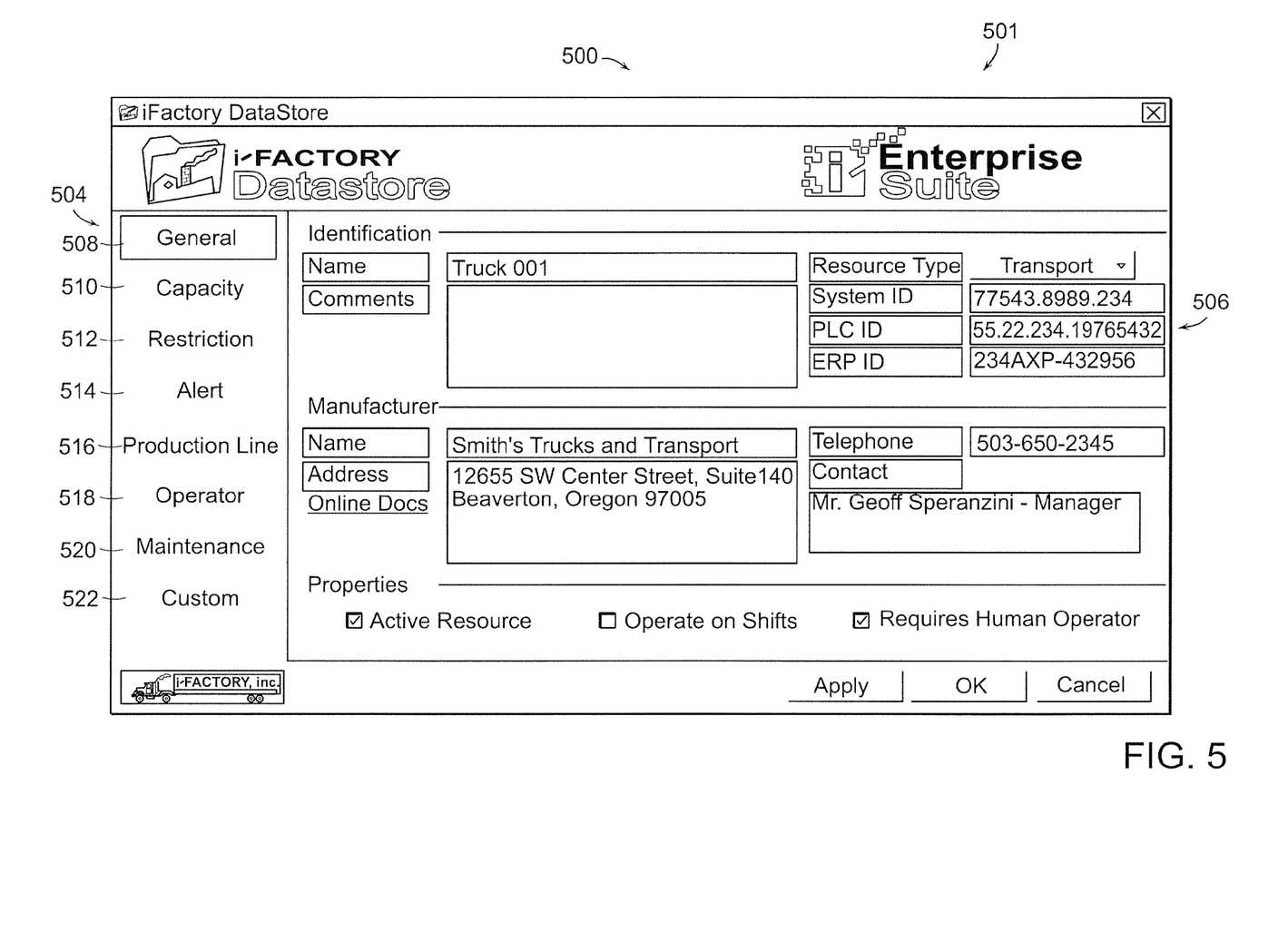
FIG. 5 is a screen display that is used by a system user for entering specific parameters associated with resource that are selected according to FIG. 4.

Referring to FIG. 5, generally at 500, an example of the characteristic parameters for a resource are shown. These characteristic parameters may be set by the user by double-clicking on the resource shown in area 402 of the screen display at FIG. 4.

Screen display 501 has two sections. The first section at 504 is directed to the categories that may be displayed in display area 506. The categories that are shown are General category 508, Capacity category 510, Restriction category 512, Alert category 514, Production Line category 516, Operator category 518, Maintenance category 520, and Custom category 522. It is understood with respect to the present invention that more/less categories and more/less information may be provided and still be within the scope of the present invention. It is also understood that this parameter values that are to be input to those signatures are stored in other electronic signatures and can be directly input to the system of the present interviewer. Accordingly, the preferred method of parameter input is to read these input parameters from such electronic systems. This input method avoids errors that may be experienced by manually outputting the parameter values. The screen as shown in display 501 will be provided in situations where it is not possible to read any or all of the required input parameters from such electronic systems.

Referring to the section 506 of the screen display 501, general information about the Truck 001 resource is shown. If the "Capacity" icon at 510 is selected, information regarding the capacity of Truck 001 resource is added. If the "Restriction" icon at 512 is selected, information regarding the restrictions associated with Truck 001 resource is added. If the "Alert" icon at 514 is selected, information regarding any alerts associated with the use of Truck 001 resource is added. If the "Production Line" icon at 516 is selected, information regarding the production lines where the Truck 001 resource is used is added. There may be one or more production lines with which Truck 001 is associated. If the "Operator" icon at 518 is selected, information regarding the operator of Truck 001 resource is added. If the "Maintenance" icon at 520 is selected, information regarding the maintenance that is necessary for Truck 001 resource is added. If the "Custom" icon at 522 is selected, information regarding the custom parameters associated with Truck 001 resource is added. For example, custom parameters may include manufacturer suggested operation speeds, manufacturer suggested maintenance intervals, and other parameters. Custom parameters vary with each installation of the system. Setting up Custom parameters may be part of the installation process for the system of the present invention.

Once the information is added to the system and method of the present invention for each of the resources of the sequence, this information is used in determining the scores for the sequences being evaluated to identify the optimal production sequence.

The terms and expressions that are use herein are meant for description, not limitation. It being recognized that there may be minor changes or modifications that must take place and be within the scope of the present invention.

The invention claimed is:

1. A computer implemented method for optimizing a production process comprising the steps of:
   (A) creating a representation for equipment for production of a product and arranging the representation in at least one sequence for production of the product, and designating each piece of equipment as a resource type according to such piece of equipment's function;
   (B) selecting the sequence created at step (A) and designating such sequence as a current sequence;

(C) calculating a value score for the current sequence according to value scores assigned to each resource in the current sequence as resources are arranged in the current sequence, with the value scores being assigned at least in consideration of characteristics of each resource;
(D) determining if there are possible unevaluated variations in the arrangement of the resources in the current sequence, and if there are no possible unevaluated variations then designating the current sequence an optimal sequence and proceeding to step (G), and if there are possible unevaluated variations, varying the arrangement of resources in the current sequence to create a new sequence;
(E) calculating a value score for the new sequence according to values assigned to each resource in the new sequence as resources are arranged in the new sequence, with the values being assigned at least according to resource characteristics;
(F) comparing the value scores for the current sequence and the new sequence to determine if the value score for the new sequence exceeds the value score for the current sequence according to predetermined criteria, and if the value score for the new sequence exceeds the value score for the current sequence, then designating the new sequence as the current sequence and proceeding to step (D), and if the value score for the current score exceeds the value score for the new sequence, then retaining the current sequence as the current sequence and proceeding to step (D); and
(G) said computer returning to a system user the optimal sequence for production of the product.

2. The method as recited in claim 1, wherein the representation of the production includes a computer-based representation of the equipment and the arrangement of such equipment.

3. The method as recited in claim 2, wherein the computer-based representation includes a virtual representation of the equipment and the arrangement of such equipment.

4. The method as recited in claim 1, wherein resource characteristics for a resource include restrictions associated with the operation of such resource.

5. The method as recited in claim 4, wherein the restrictions include restrictions associated with interaction of resources.

6. The method as recited in claim 1, wherein calculating a value score for the current sequence, further includes the substeps of:
(A) selecting the last resource in the current sequence and designating such resource as the current resource;
(B) determining if there is another resource upstream in the current sequence and if there is an upstream resource, selecting the upstream resource and designating such upstream resource as the current resource, and repeating step (B) until an upstream resource is not identified, then proceeding to step (C); and
(C) calculating a value score for the current sequence based on a composite of the assigned values of each of the resources of the current sequence selected at steps (A) and (B).

7. The method as recited in claim 1, wherein calculating a value score for the current sequence, further includes the substeps of:
(A) selecting the last resource in the new sequence and designating such resource as the new resource;
(B) determining if there is another resource upstream in the new sequence and if there is an upstream resource, selecting the upstream resource and designating such upstream resource as the new resource, and repeating step (B) until an upstream resource is not identified, then proceeding to step (C); and
(C) calculating a value score for the new sequence based on a composite of the assigned values of each of the resources of the sequence selected at steps (A) and (B).

8. The method as recited in claim 6 or 7, wherein assigning a value to each resource includes a value based on at least a time score, energy score and/or human resource score for that resource.

9. The method as recited in claim 8, wherein the method is capable of calculating a value score for a sequence at any point in time during operation of that sequence.

10. The method as recited in claim 1, wherein the method is capable of calculating a value score for a sequence that processes products in batch form.

11. A computer-base system for optimizing a production process comprising:
(A) means for creating a representation of equipment for production of a product and arranging the representation in at least one sequence for production of the product, and means for receiving a designation for each piece of equipment as a resource type according to such piece of equipment's function;
(B) means for selecting the sequence created at step (A) and designating such sequence as a current sequence;
(C) means for calculating a value score for the current sequence according to value scores assigned to each resource in the current sequence that are received by the system as resources are arranged in the current sequence, with the value scores being assigned at least in consideration of characteristics of each resource;
(D) means for determining if there are possible unevaluated variations in the arrangement of the resources in the current sequence, and if there are no possible unevaluated variations then designating the current sequence an optimal sequence and proceeding to step (G), and if there are possible unevaluated variations, varying the arrangement of resources in the current sequence to create a new sequence;
(E) means for calculating a value score for the new sequence according to values assigned to each resource in the new sequence as resources are arranged in the new sequence, with the values being assigned at least according to resource characteristics;
(F) means for comparing the value scores for the current sequence and the new sequence to determine if the value score for the new sequence exceeds the value score for the current sequence according to predetermined criteria, and if the value score for the new sequence exceeds the value score for the current sequence, then designating the new sequence as the current sequence and proceeding to step (D), and if the value score for the current score exceeds the value score for the new sequence, then retaining the current sequence as the current sequence and proceeding to step (D); and
(G) means for returning to a system user the optimal sequence for production of the product.

12. The system as recited in claim 11, wherein the means for creating the representation of the production includes a computer-based representation of the equipment and the arrangement of such equipment.

13. The system as recited in claim 12, wherein the computer-based representation includes a virtual representation of the equipment and the arrangement of such equipment.

14. The system as recited in claim 11, wherein resource characteristics for a resource include restrictions associated with the operation of such resource.

15. The system as recited in claim 14, wherein the restrictions include restrictions associated with interaction of resources.

16. The system as recited in claim 11, wherein the means for calculating a value score for the current sequence, further includes computer-based:
   (A) means for selecting the last resource in the current sequence and designating such resource as a current resource;
   (B) means for determining if there is another resource upstream in the current sequence and if there is an upstream resource, selecting the upstream resource and designating such upstream resource as the current resource, and repeating step (B) until an upstream resource is not identified, then proceeding to step (C); and
   (C) means for calculating a value score for the current sequence based on a composite of the assigned values of each of the resources of the current sequence selected at steps (A) and (B).

17. The system as recited in claim 11, wherein the means for calculating a value score for the current sequence, further includes computer-based:
   (A) means for selecting the last resource in the new sequence and designating such resource as a current resource;
   (B) means for determining if there is another resource upstream in the new sequence and if there is an upstream resource, selecting the upstream resource and designating such upstream resource as the current resource, and repeating step (B) until an upstream resource is not identified, then proceeding to step (C); and
   (C) means for calculating a value score for the new sequence based on a composite of the assigned values of each of the resources of the new sequence selected at steps (A) and (B).

18. The system as recited in claim 16 or 17, wherein assigning a value to each resource includes a value based on at least a time score, energy score and/or human resource score for that resource.

19. The system as recited in claim 18, wherein the system is capable of calculating a value score for a sequence at any point in time during operation of that sequence.

20. The system as recited in claim 11, wherein the system is capable of calculating a value score for a sequence that processes products in batch form.

* * * * *